United States Patent Office 3,147,254
Patented Sept. 1, 1964

3,147,254
HALOGENATED CYANURIC ACIDS AND
THEIR SALTS
Laurene O. Paterson, Adrian, Mich., assignor to Drug Research, Inc., Adrian, Mich., a corporation of Michigan
No Drawing. Filed Aug. 15, 1960, Ser. No. 48,011
14 Claims. (Cl. 260—242)

This invention is a continuation-in-part of my co-pending application Serial No. 837,369, now abandoned, filed September 1, 1959, and 593,047, filed June 22, 1956, and 602,466, filed August 6, 1956, co-pending therewith, now Patent Number 2,868,787, in turn co-pending with 2,779,764 issued January 26, 1957, upon application Serial Number 483,633, which was filed June 22, 1954, and relates to new compounds of cyanuric acid and their methods of manufacture. More particularly, this invention pertains to N-halogenated cyanuric acids containing both chlorine and bromine as active components, and to the salts of said acids.

It has been rather conclusively demonstrated by X-ray diffraction data that cyanuric acid, as the solid and in solution, exists principally, if not entirely, in the lactam form. In view of this the N-halogenated cyanuric acids are compounds wherein the halogen atoms are loosely bound to the lactam nitrogen, such halogen atoms being readily available for chemical reaction. The N-halogenated cyanuric acids of this invention contain at least one N-bromo radical and one N-chloro radical, but they may also contain an additional N-chloro radical or one =NH group may be unsubstituted. These N-halogenated cyanuric acids, in their free acid or salt form, are highly efficient halogen donors which donate both active bromine and active chlorine.

The compounds of this invention are useful as valuable disinfecting and bleaching agents, since the inclusion of bromine in addition to chlorine permits increased residual activity. Aqueous systems containing the compounds of the present invention constitute controlled oxidation media, the bromine being continuously regenerated by the chlorine to act as the active oxidizing component.

Cyanuric acid, a well known S-triazine derivative, is a relatively strong acid having a dissociation constant ($K_a$ at 25° C.) of $3.2 \times 10^{-7}$ for the first ionizable hydrogen and $2.5 \times 10^{-11}$ for a second ionizable hydrogen. Thus, cyanuric acid forms salts with inorganic and organic cations, and these salts, when halogenated, give compounds more stable than those compounds of the free acid because of the higher pH values prevailing in solutions containing such salts.

Cyanuric itself can be partially or completely chlorinated but it cannot be completely brominated since the highly ionizable N-hydrogen atom is more readily replaced by a metal ion than by a positive bromine.

In accordance with the present invention, cyanuric acid and its salts containing varying amounts of both bromine and chlorine are provided. These compounds may be prepared by reacting cyanuric acid or its salt with bromine in an aqueous alkaline medium to produce the N-monobromo compound, and then further halogenating by the introduction of chlorine gas into the reaction medium. Compounds which may be produced by the mixed halogenation of cyanuric acid or its salts are N-monobromo-N,N-dichloro-cyanuric acid, and N-monobromo-N-monochloro-cyanuric acid and mixtures of N-monobromo-N-monochloro-cyanuric acid with the N-monobromo-cyanuric, the N,N-dichloro-cyanuric and N,N,N-trichloro-cyanuric acids, and their stable inorganic and organic salts.

Among the preferred stable salts of an N-brominated N-chlorinated cyanuric acid contemplated as an embodiment of the present invention are the monovalent metal salts, typically of the alkali metals, such as sodium, potassium or lithium as well as copper, the divalent metal salts, typically of the alkaline earth metal salts such as magnesium, calcium, strontium and barium, as well as zinc and nickel, the trivalent metal salts such as aluminum and chromium, the tetravalent metal salts such as tin, and even higher valent metal salts such as vanadium. A typical salt having an organic cation is N-brominated-N-chlorinated-melamine-cyanurate.

N-brominated-N-chlorinated cyanuric acids of this invention can be prepared by mixing cyanuric acid with water containing at least two equivalents of an alkalizing agent, such as sodium hydroxide, sodium carbonate or the like, adding to this mixture a brominating agent, and completing the halogenation by the introduction of chlorine gas. Under these conditions, bromine preferentially substitutes for an N-hydrogen atom, forming by-product sodium bromide. The chlorine as introduced, first displaces the bromine from any alkali bromide, and then after all the released bromine is taken up by the cyanuric acid, the chlorine enters the cyanuric acid molecule. Since chlorine reacts to displace bromine from a bromine salt, such salt may be used initially as a source for bromine. Any appreciable bromine uptake by cyanuric acid proceeds only in the presence of alkali which serves to neutralize the by-product hydrochloric acid. Varying amounts of bromine and chlorine may be thus substituted in cyanuric acid by controlling the amount of alkali and halogens added. Where incomplete saturation of a given quantity of cyanuric acid with halogen is desired, less alkali, chlorine and/or bromine are used. Mixtures of N-halo-cyanuric acids may thus be produced showing a wide range of bromine and chlorine content.

To form the N-brominated-N-chlorinated cyanuric acid salts an excess of alkali beyond that required to neutralize the by-product hydrochloric acid is used. Where cyanuric acid is supplied as a salt the alkali added need be only sufficient to neutralize the by-product acid.

When the hydroxide of a metal is insoluble it may be added as such, formed in situ by the addition of a salt to an equivalent of alkali, or be provided in soluble amphoteric salt form, as for instance by using sodium aluminate, sodium zincate, sodium stannate, or sodium antimonate.

N-brominated-N-chlorinated cyanuric acids of this invention can also be prepared by an alternate procedure which involves adding an inorganic bromide to a N-polychlorinated cyanuric acid or its salts.

N-brominated-N-chlorinated derivatives of cyanuric acid can also be formed by halogen exchange between mixtures of the N,N-dibromo cyanuric acid or their salts and the N-polychlorinated cyanuric acids or their salts.

The following examples illustrate some of the compounds of the present invention and some of their methods of manufacture.

*Example 1*

One hundred and twenty-nine grams (1 equiv.) of cyanuric acid were dissolved in 8,000 mililiters of water containing 80 grams (2 equiv.) of sodium hydroxide. To this solution were added slowly 80 grams (1 equiv.) of liquid bromine. Gaseous chlorine was then added during constant agitation until the pH reached 5. The resultant product consisted substantially of N-monobromo-N-monochloro-cyanuric acid. Upon analysis the product was found to contain 33 percent bromine and 14 percent chlorine.

*Example 2*

One hundred and twenty-nine grams (1 equiv.) of cyanuric acid were suspended in 800 mililiters of water containing 120 grams (3 equiv.) of sodium hydroxide. Eighty grams (1 equiv.) of liquid bromine were added to this suspension and gaseous chlorine was then introduced with stirring until the reaction was complete as determined by the pH falling below 7. The resultant product was N-bromo-N,N-dichloro-cyanuric acid. Upon analysis the product was found to contain 28.5 percent bromine and 25 percent chlorine.

*Example 3*

One hundred and ninety-eight grams of N-N-dichloro cyanuric acid (1 equiv.) were slurried in 2 liters of water for 4 hours. The temperature was lowered to 10° C. and 103 (1 equiv.) grams of sodium bromide dissolved in 200 milliliters of water were added during constant agitation. When all the released bromine had been taken up, the product was removed on a filter, washed and dried. It weighed 237 grams and consisted essentially of N-monobromo-N-monochloro cyanuric acid.

*Example 4*

One hundred and twenty-nine grams of cyanuric acid (1 equiv.) were dissolved in 8,000 milliliters of water containing 80 grams (2 equiv.) of sodium hydroxide. This solution was cooled to 10° C. and 80 grams (1 equiv.) of liquid bromine were added slowly. When all the bromine was taken up, chlorine gas and 200 grams of 20 percent sodium hydroxide solution (1 equiv.) were added simultaneously to effect a final pH value of 7 and the product was removed on a filter, washed and dried. It consisted essentially of sodium N-monobromo-N-monochloro-cyanurate. Other alkali and alkali earth metal hydroxides when substituted for the sodium hydroxide of this example such as potassium lithium, barium, magnesium, and the like hydroxides will form such salts of the N-brominated-N-chlorinated cyanuric acid by this procedure.

*Example 5*

One hundred and fifty-one grams of sodium cyanurate was dissolved in 5,000 ml. of water. To this was added 400 ml. of 10% sodium hydroxide solution containing in addition 148 grams of a cupric hydroxide paste. This suspension was agitated, 103 grams of sodium bromide were added, and the whole chlorinated at room temperature to a final pH of 6.6. The copper salt of N-monobromo-N-monochloro-cyanuric acid was removed on a filter, washed and dried. It weighed 324 grams, and analyzed 24.2% bromine and 9.8% chlorine.

*Example 6*

One hundred and twenty-nine grams of cyanuric acid (1 equiv.) were dissolved in 5,000 ml. of water containing 205 grams of sodium aluminate. Eighty grams of liquid bromine were added slowly and when all this was taken up the mixture was chlorinated to a pH of 5.2. The resultant product consisted essentially of the aluminum salt of N-monobromo-N-dichloro cyanuric acid.

Examples 4, 5, and 6 illustrate methods of preparing various N-brominated-N-chlorinated cyanuric acid salts. As can be realized I may react the cyanuric acid as such with a brominating agent and chlorine in the presence of an inorganic metallic compound used in sufficient quantity to neutralize the by-product hydrochloric acid and form the N-halogenated cyanuric acid salt. In cases where it is desired to form a salt of some metal other than that used to react with the by-product hydrochloric acid, I may start with such cyanuric acid salt, or include in the neutralizing alkaline mixture a sufficient quantity of the desired cation for the purpose. The various salts of the N-halogenated cyanuric acids may also be prepared by reacting the N-polychlorinated cyanurates with a bromide, or by using a bromine salt of the metallic cation desired in the final N-halogenated cyanurate. Generally the more basic alkaline and alkaline earth alkalizers will act preferentially to remove the hydrochloric acid. Other metallic cations present in the reaction mixture will attack the N-halogenated cyanuric acid to form the salt thereof, particularly if such cyanuric acid salt is of lower solubility.

While several particular embodiments of this invention are shown above, it will be understood that the invention is not to be limited thereto, since many modifications may be made, and it is contemplated therefore by the appended claims to cover any such modifications as fall within the true spirit and scope of this invention.

I claim:
1. Aluminum N-monobromo-N-monochloro cyanurate.
2. Copper N-monobromo-N-monochloro cyanurate.
3. Zinc N-bromo-N-chloro cyanurate.
4. Magnesium N-bromo-N-chloro cyanurate.
5. Tin N-bromo-N-chloro cyanurate.
6. Melamine salt of N-brominated-N-chlorinated cyanuric acid.
7. N-halogenated cyanuric acid compound having the formula

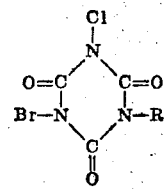

wherein R is selected from the group consisting of chlorine, hydrogen, sodium, potassium, lithium, calcium, strontium, barium, magnesium, aluminum, tin, iron, zinc, copper, chromium, nickel and antimony.

8. N-monobromo-N-monochloro-cyanuric acid.
9. N-monobromo-N,N-dichloro-cyanuric acid.
10. Sodium-N-monobromo-N-monochloro-cyanurate.
11. Potassium-N-monobromo-N-monochloro-cyanurate.
12. Calcium-N-monobromo-N-monochloro-cyanurate.
13. Lithium-N-monobromo-N-monochloro-cyanurate.
14. Iron-N-monobromo-N-monochloro-cyanurate.

References Cited in the file of this patent

UNITED STATES PATENTS

| | | |
|---|---|---|
| 2,171,901 | Wilson et al. | Sept. 5, 1939 |
| 2,607,738 | Hardy | Aug. 19, 1952 |
| 2,779,764 | Patterson | Jan. 26, 1957 |
| 2,828,308 | Lorenz | Mar. 25, 1958 |
| 2,868,787 | Patterson | Jan. 13, 1959 |
| 2,913,460 | Brown et al. | Nov. 17, 1959 |
| 2,929,816 | Chamberlain | Mar. 22, 1960 |
| 3,055,889 | Marek | Sept. 25, 1962 |

FOREIGN PATENTS

| | | |
|---|---|---|
| 1,149,758 | France | July 22, 1957 |

OTHER REFERENCES

Chattaway et al.: Journ. of the Chem. Soc., vol. 81, pages 200 to 203 (1902).

Birckenbach et al.: Ber. d. Deut. Chem. Ges., vol. 62, pages 2261–3 (1929).

Grundmann et al.: Annalen der Chemie, vol. 577, pages 83 to 87 and 90 to 95 (1952).

Nebbia et al.: La Chimica e l'Industria, vol. 39, No. 2, pages 81 to 83 (1957).

Smolin et al.: "S-triazines and Derivatives," pages 36 to 42, Interscience Publishers Inc., N.Y., February 1959.

J. Org. Chem., vol. 25, pages 1595 to 1598 (1960).

Chemical Abstracts, vol. 55, col. 8426 (1961).

UNITED STATES PATENT OFFICE
CERTIFICATE OF CORRECTION

Patent No. 3,147,254              September 1, 1964

Laurene O. Paterson

It is hereby certified that error appears in the above numbered patent requiring correction and that the said Letters Patent should read as corrected below.

In the grant, line 1, for "Laurence O. Paterson" read -- Laurene O. Paterson --; column 3, lines 56 and 57, for "aluminum salt of N-monobromo-N-dichloro cyanuric acid" read -- aluminum salt of N-mono-bromo-N-mono-chloro-cyanuric acid --.

Signed and sealed this 27th day of April 1965.

SEAL)
Attest:

ERNEST W. SWIDER
Attesting Officer

EDWARD J. BRENNER
Commissioner of Patents